Feb. 7, 1939.　　　　F. RYAN　　　　2,145,952
VEHICLE BUMPER
Filed May 11, 1937
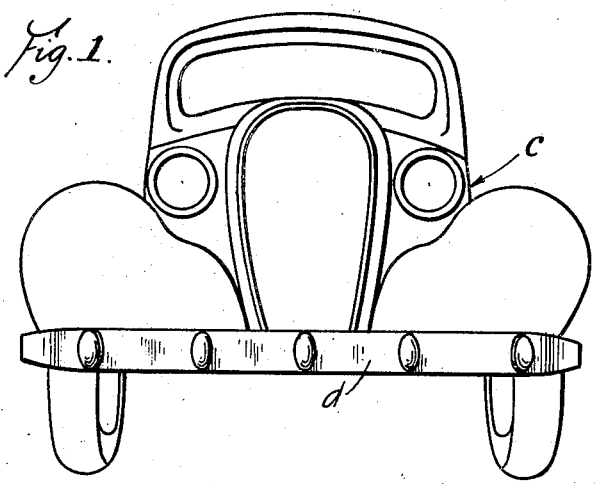
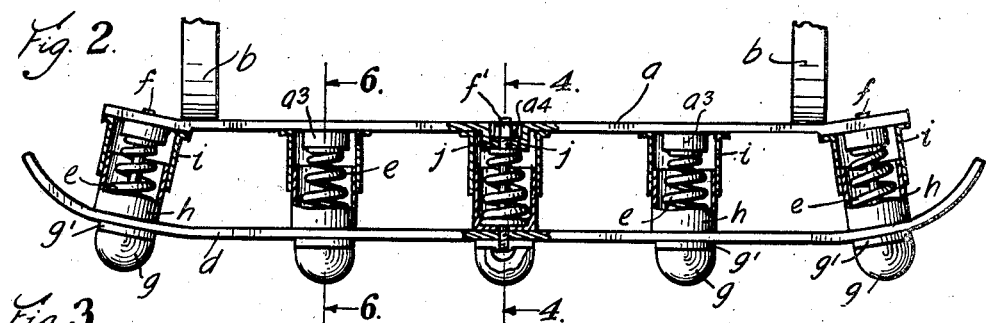
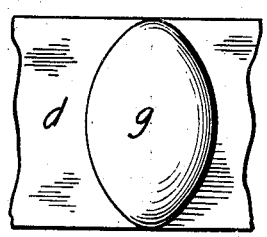
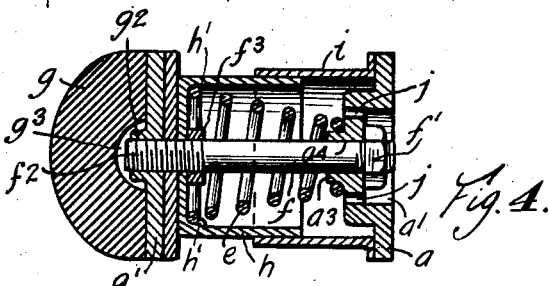
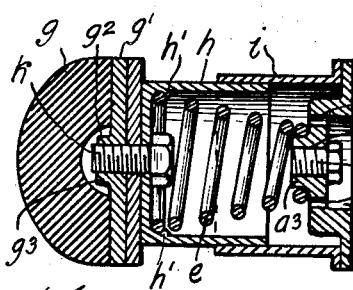
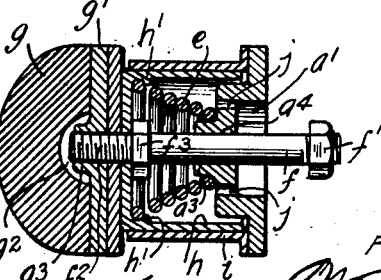
Inventor:
Frank Ryan
Attorney.

Patented Feb. 7, 1939

2,145,952

UNITED STATES PATENT OFFICE 2,145,952

VEHICLE BUMPER

Frank Ryan, Portland, Oreg.

Application May 11, 1937, Serial No. 141,950

3 Claims. (Cl. 293—55)

The object of my invention is to provide a bumper for automobiles and other vehicles, which is adapted resiliently to cushion blows struck upon said bumper, but yet to be of sufficient rigidity to protect the automobile or other vehicle from injury.

It is common practice at the present time to provide bumper bars of one or more sections of metal more or less rigidly secured to the frame ends of an automobile. Heretofore it was common practice resiliently to mount said bumper bars upon the ends of automobiles and other vehicles, but said resilient type of bumper has been in relative disfavor in the face of increased operating speeds of automobiles, and because it is felt that the principal feature of a bumper is to protect said vehicle rather than minimize shock with respect thereto.

I have provided a vehicle bumper which provides resiliency in two manners: (1) Said bumper is resiliently mounted upon its base or mounting through the agency of coiled springs and telescopic members surrounding said springs, which provide an air cushion. (2) Protective rubber pads are arranged across the face of the bumper bar. Said rubber pads are relatively resilient and absorb slight bumps and tend to prevent marring surfaces with which the metallic part of said bumper bar would otherwise come in contact.

A further and incidental object of my invention is to provide an automobile or other vehicle bumper comprising two sections resiliently spaced apart by coil springs, made in a simple manner, capable of quantity production. The structures are adapted to eliminate rattling, are sufficiently resilient to sustain shocks varying from minor rubbing contacts to those involving substantial blows. That is, the rubber pads upon the front of the bumper bar absorb a slight shock or bump, while the springs with their telescopic covers are adapted to withstand substantial blows without injury thereto, or to the parts which they separate and the machine which said bumper protects.

Further details of my invention are hereinafter described with reference to the accompanying drawing, in which:

Fig. 1 is an elevation of an automobile having one of my improved bumpers mounted thereon;

Fig. 2 is a plan view of said bumper carried by the front frame ends of said vehicle, portions of the telescopic casings therefor and of the bumper being shown broken away to disclose details of construction;

Fig. 3 is an enlarged elevation of one of the rubber bumper pads shown upon a fragmentary portion of a bumper bar;

Fig. 4 is a section through one of the spring elements and a bumper pad overlying it, said section being taken on the line 4—4 in Fig. 2;

Fig. 5 is a view showing the parts disclosed in Fig. 4 compressed as when they are subject to shock; and Fig. 6 is a section taken on the line 6—6 in Fig. 2 through one of the spring elements, in which the tying bolt does not extend from the bumper bar to its mounting.

A vehicle bumper embodying my invention comprises a longitudinal mounting $a$, adapted to be carried by the front ends of the frame members $b$ of an automobile $c$. A bumper bar $d$ is carried by the mounting $a$ and is separated therefrom by resilient spring members $e$. These preferably are helically coiled spring members, frustro-conical in elevation. That is, each helically coiled spring member increases in diameter as it approaches one end.

Extending through certain of said spring members are tie bolts $f$. In the drawing I have shown five spring members spaced equally along the length of the mounting and the bumper bar, and three tie bolts—one tie bolt arranged at each end of the bumper bar and one substantially at the middle thereof. The spring members lying at each side of the middle tie bolt have no bolts or other members extending therethrough. The tie bolts extend centrally through the selected spring members, one end being screw threaded into a bumper pad $g$, having a metallic base plate $g'$ secured thereto, and the other end being secured to the mounting $a$ by a nut $f'$. The mountings are provided with recessed portions $a'$ in which said nut $f'$ seats. The bumper pads preferably are made of relatively soft rubber having a substantial factor of resiliency. The pads are secured to their base plates by vulcanizing preferably, although they can be secured thereto by screws or other fastening means.

The base plate $g'$ preferably has a boss $g^2$ formed therein so as to extend the length of the threaded portion of the base plate to have greater engagement with the threaded end $f^2$ of the tie bolt which it engages. The bumper pad is made hollow at $g^3$ upon its inner face centrally, so that it can accommodate said boss and the extended end of the tie bolt which engages therewith. Said hollowed portion $g^3$ of said bumper pad is of greater depth than the length of said boss, and thus the threaded end of the tie bolt may extend therethrough substantially to a greater degree than is shown in Figs. 4, 5 and 6, without distorting the bumper pad or tending to loosen the bond or other mode of securement between the bumper pad and its base plate.

Surrounding each of the tie bolts is a spring member $e$, as has been heretofore described, and each of said springs is held in place by telescopic members $h$ and $i$, which are cup-shaped and the open mouths of said members face and overlie one the other. The telescopic member $h$ is secured to the inner face of the bumper bar by a nut $f^3$, secured to the threaded end $f^2$ of the tie bolt $f$. The telescopic member $i$ is secured to the mounting $a$ by welding or by bolts, nuts, or other devices not shown in the drawing, but which would suggest themselves to persons skilled in the art. I deem that welding is preferable because it provides a more certain connection between the telescopic member $i$ and the mounting.

The bore of the telescopic mounting member $h$ engages the coil of a spring member $i$ of greatest diameter, as is shown in Figs. 4 to 6. A recess $h'$ preferably is formed in said telescopic member which surrounds the contour of the largest coil of the spring member $e$ to hold said spring against lateral movement, which might product rattling. The other end of the spring member ends in the coil of smallest diameter, which encircles closely about a boss $a^3$ formed upon the inner face of the recessed portion $a'$ of the mounting.

The tie bolt and its nut are arranged so that the spring members $e$ are subject to substantial initial compression, and said initial compression tends to hold the members tightly against each other to prevent rattling and to give rigid lateral support to the bumper bar and the connecting members therewith. The telescopic members fit relatively closely about each other so that if no air hole were provided a substantial quantity of air would be entrapped therein to cushion a blow struck upon the bumper bar. An air hole $j$ of relatively small section is drilled through the recessed portion $a'$ of the mounting so that a controlled flow of air is permitted to escape from and to pass into the interior of said telescopic members as they move toward and from each other, respectively.

The area of each of said air holes is computed to have a substantial restricting effect toward the movements of the telescopic members relatively to each other. Thus as a spring member is compressed as is shown relatively in Figs. 4 and 5, the air entrapped within the telescopic members has been permitted to escape through the relatively small air hole $j$, and the entrapping of said air tends to aid the spring members in cushioning a severe blow. Thus when an extremely severe blow is struck upon the bumper bar, the tendency of the air to escape would be limited because of the size of the air hole, and thus the entrapped air would provide a substantially greater cushioning effect than if a lesser quantity of air were required to escape through said hole or if a longer time interval were provided for permitting said escape.

It is desirable to coat the walls of said telescopic members with a lubricant, preferably one having some substantial viscosity, not only to aid the passage of one member over the other, but also to seal the space between the bore of the outer telescopic member and the periphery of the inner one. This quantity of lubricant should not be so large that it cuts down the air space within the telescopic members substantially, but should be sufficiently large so as to supply said members for a long period of time, thus eliminating the necessity of opening them up to replenish said lubricant.

Those springs which do not have a tie bolt extending therethru are provided with a relatively short stud $k$, which fastens the telescopic member $h$ to a bumper pad $g$ which overlies it. The telescopic members and the other associated parts hold the spring in proper relative relation.

As is noted most clearly in Fig. 2, there is one bumper pad $g$ over each spring, and said bumper pads extend laterally beyond the faces of the bumper bars. Thus any plane object will be engaged by the bumper pads and the blow will tend to be transmitted directly to the coiled spring members. The bumper pads are made of relatively soft material such as soft rubber, and do not mar a highly polished surface such for example as plating of other bumper bars or the finish of an automobile which it might contact. Said bumper pads preferably are relatively small in section, as is shown in Fig. 1, and thus appear more or less as ornamental buttons upon the face of the bumper bar and give some ornamental value to said bumper bar.

The coils of the springs are hidden from view by the telescopic members $h$ and $i$, and thus said members can seal the operative mechanism as well as add additional cushioning effect to the springs which they enclose. In the spring mountings where a tie bolt is absent, I deem it preferable that the hole $a^4$ through which the tie bolt is passed be sealed by a threaded plug $l$, so that admission of air into and from the interior of the telescopic members can only be through the air hole $j$.

I claim:

1. In a vehicle bumper of the character described, an elongated mounting adapted to extend horizontally across one end of a vehicle and to be secured thereto, a bumper bar spaced therefrom but alined therewith, a series of tie elements secured to said bumper bar and slidably engaging said mounting, said tie elements limiting the maximum spacing of said bar and its mounting, spring elements encircling said tie elements and tending resiliently to maintain said bar and its mounting at said maximum spacing, and spaced resilient pads arranged upon and projecting from the outer face of said bumper bar, each pad overlying a tie element and being directly secured thereto.

2. In a vehicle bumper of the character described, an elongated mounting adapted to extend horizontally across one end of a vehicle and to be secured thereto, a bumper bar spaced therefrom but alined therewith, a series of tie elements secured to said bumper bar and slidably engaging said mounting, said tie elements limiting the maximum spacing of said bar and its mounting, spring elements encircling said tie elements and tending resiliently to maintain said bar and its mounting at said maximum spacing, and spaced resilient pads arranged upon and projecting from the outer face of said bumper bar, each pad overlying a tie element and being directly secured thereto, each pad provided with a metallic base secured to the end of a tie element and bearing against the face of said bumper bar.

3. In a vehicle bumper of the character described, an elongated mounting adapted to extend horizontally across one end of a vehicle and to be secured thereto, a bumper bar spaced therefrom but alined therewith, a series of tie elements secured to said bumper bar and slidably engaging said mounting, said tie elements limiting the maximum spacing of said bar and its mounting, spring elements encircling said tie elements and tending resiliently to maintain said bar and its mounting at said maximum spacing, a pair of opposed cup-shaped members slidably engaging one another, said members being secured respectively to and lying between said bar and its mounting, said cup-shaped members enclosing said spring elements, and spaced resilient pads arranged upon and projecting from the outer face of said bumper bar, each pad overlying a tie element and being directly secured thereto, each pad provided with a metallic base secured to the end of a tie element and bearing against the face of said bumper bar.

FRANK RYAN.